CONTROL CIRCUIT WITH REVERSIBLE POLARITY OUTPUT

Filed Aug. 20, 1964 3 Sheets-Sheet 1

INVENTOR.
WALTER V. CHUMAKOV
BY
OSTROLENK, FABER, GERB & SOFFEN
ATTORNEYS

CONTROL CIRCUIT WITH REVERSIBLE POLARITY OUTPUT

Filed Aug. 20, 1964 3 Sheets-Sheet 2

INVENTOR
WALTER V. CHUMAKOV
BY
OSTROLENK, FABER, GERB & SOFFEN
ATTORNEYS

CONTROL CIRCUIT WITH REVERSIBLE POLARITY OUTPUT

Filed Aug. 20, 1964 3 Sheets-Sheet 3

INVENTOR.
WALTER V. CHUMAKOV
BY
OSTROLENK, FABER, GERB & SOFFEN
ATTORNEYS

United States Patent Office
3,328,709
Patented June 27, 1967

3,328,709
CONTROL CIRCUIT WITH REVERSIBLE POLARITY OUTPUT

Walter V. Chumakov, Philadelphia, Pa., assignor to I-T-E Circuit Breaker Company, Philadelphia, Pa., a corporation of Pennsylvania Filed Aug. 20, 1964, Ser. No. 390,813
6 Claims. (Cl. 329—50)

ABSTRACT OF THE DISCLOSURE

A circuit for delivering a reversible polarity output signal in which a master oscillator drives both an auxiliary reference oscillator and excitation oscillator at the same frequency. The output of the auxiliary reference oscillator is electrically mixed with the A.C. input of a measuring transductor in a differential resistor which is also connected to the excitation oscillator. The output voltage across the differential resistor is then connected to a demodulator circuit which delivers a reversible polarity output signal dependent upon the A.C. input transductor signal.

This invention relates to control circuits, and more specifically relates to a control circuit wherein the polarity of the circuit output is reversible, depending upon the magnitude of an input signal.

Many applications such as control regulators, error detection and servo motor drive systems require a reversible polarity output from their sensing devices and amplifiers. Thus, the sensing devices must be capable of delivering a first polarity for measured signals below some predetermined input signal magnitude, and a second polarity for measuring signals greater than the predetermined input signal magnitude.

It is common practice to use magnetic amplifiers such as two single-ended amplifiers using saturable reactors or self-saturating-type magnetic amplifiers operated in push-pull fashion to obtain such reversible polarity output.

However, push-pull circuits of this type generally have the disadvantage of low efficiency, and they accentuate various problems associated with magnetic devices such as local instabilities, non-linearities, drift, and the like. Moreover, the rectifiers used in the magnetic amplifiers introduce additional drift and can lead to unstable operation on inductive or low impedance loads. Another difficulty which has been found with such circuits is the snap action or triggering phenomena well known in the magnetic amplifier field.

The output characteristics of such push-pull connected magnetic amplifiers will also shown discontinuities, dead zones, and non-linearities under zero signal and output current of the control or metering system. These instability conditions may also be more severe at high control and high load impedances. That is, in push-pull systems, negative feedback may occur not only as zero current, but also at other points on the output characteristic particularly where one of the amplifiers reaches minimum output or saturation, or operates in a resistance limited region.

The zero point adjustments and separate D.C. biasing signals are also required in many push-pull circuits of the prior art type to shift the individual amplifier characteristics and to compensate for core unbalance. Consequently, in a regulating-type feedback system, the reference signal must be kept constant for high performance, and the D.C. bias current must be constant.

A still further difficulty with the prior art type magnetic circuits is that the interaction between reference windings, control windings and biasing windings require careful attention to the design of the amplifiers and the magnetic circuit.

The principle of the present invention is to provide a novel single transductor or amplifier for delivering a reversible polarity output signal wherein the normally used D.C. bias is replaced by a controlled A.C. bias which is superimposed on the A.C. output of a magnetic device. This novel circuit arrangement then provides means for obtaining reversible polarity outputs in a more reliable and less expensive manner than heretofore possible.

Accordingly, a primary object of this invention is to provide a novel reversible polarity output control circuit which eliminates push-pull type magnetic core circuitry.

Another object of this invention is to provide a novel reversible polarity output circuit from a magnetic amplifier type device wherein the separate D.C. bias is eliminated.

A still further object of this invention is to provide a novel reversible polarity output control circuit wherein the output is an A.C. output so that A.C. amplifiers may be used in subsequent amplification stages.

Yet another object of this invention is to provide a novel reversible polarity output control circuit which eliminates instabilities, dead zone, and change in gain at zero output current of the control system.

These and other objects of this invention will become apparent from the following description when taken in connection with the drawings, in which.

Figure 3:
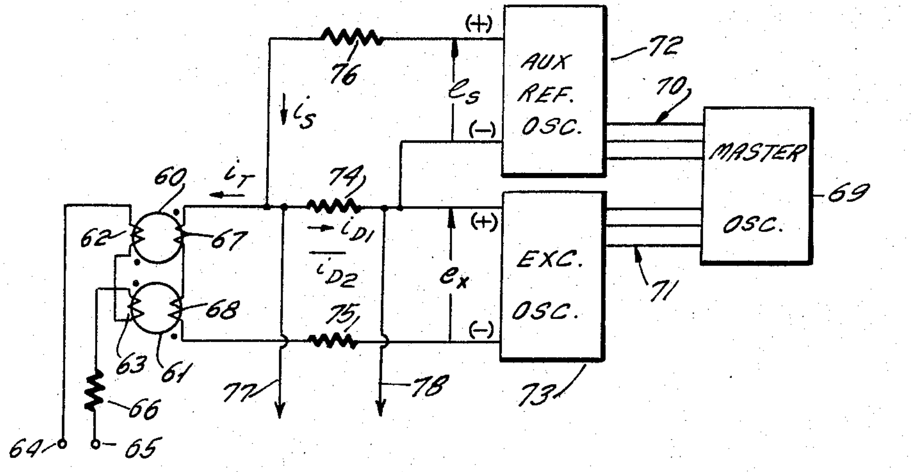
FIGURE 3 is a block diagram of the novel circuit of the invention.

FIGURES *4a*, *4b*, *4c* and *4d* illustrate characteristic curves of the voltages and currents in the circuit of FIGURE 3 as a function of time.

Figure 5:
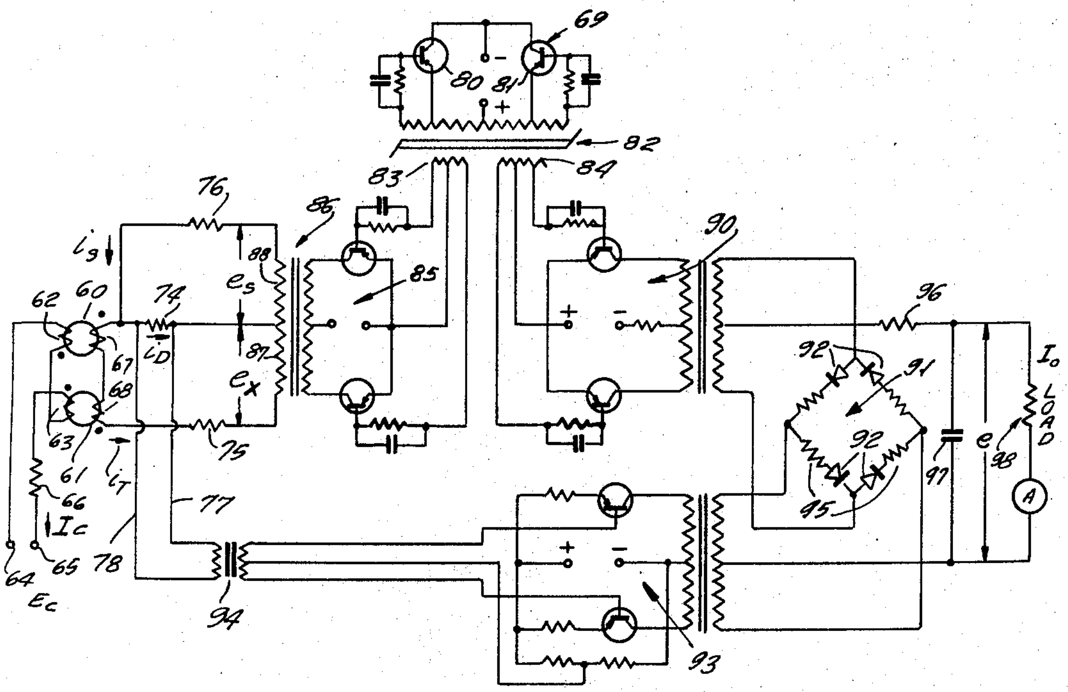

FIGURE 5 illustrates a more detailed circuit diagram of the present invention when using an A.C. amplifier and a ring demodulator.

Figure 6:
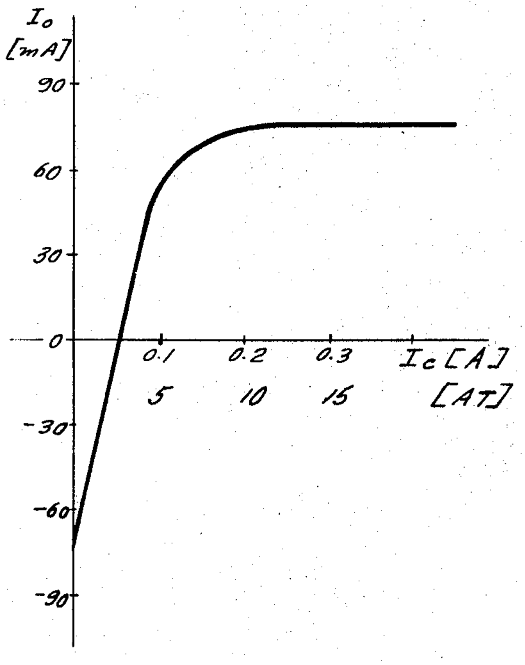

FIGURE 6 illustrates the control characteristic of the circuit of FIGURE 5.

Figure 1:
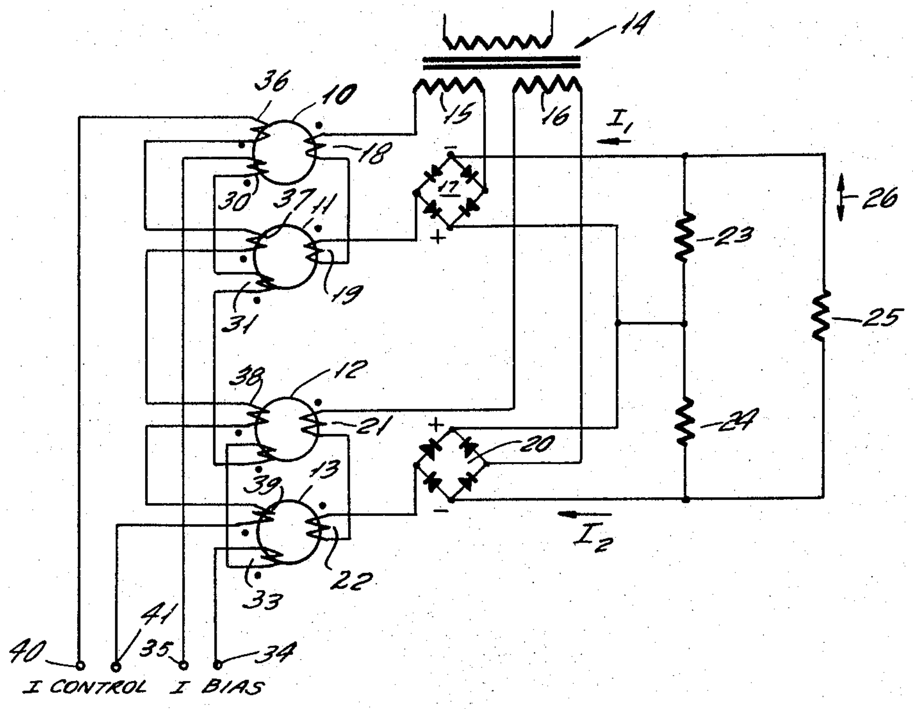
FIG. 1 PRIOR ART
FIGURE 1 illustrates a prior art type of push-pull output saturable reactor circuit for producing a reversible polarity output signal.

Referring first to FIGURE 1, I have illustrated therein a typical saturable reactor circuit having a push-pull output which includes four magnetic cores 10, 11, 12 and 13 where cores 10 and 11 and cores 12 and 13 form respective pairs of cores for respective amplifiers in the usual manner.

An A-C source of voltage is connected to the primary winding of transformer 14 which has two secondary windings 15 and 16. Secondary winding 15 is connected to rectifier 17 and the output of rectifier 17 is then connected to the series connected windings 18 and 19 of cores 10 and 11 respectively. Note that the usual dots indicate the polarity of each of the windings for reactor cores 10 through 13. Transformer secondary winding 16 is then connected to rectifier 20 which, in turn, is connected in series with windings 21 and 22 of cores 12 and 13 respectively.

The output of the circuit is taken from the negative terminals of rectifiers 17 and 20 which are connected in series with base load resistors 23 and 24. The terminal common to base load resistors 23 and 24 is then connected to the positive terminal of each of rectifiers 17 and 20.

The main load circuit is then formed by some suitable load impedance 25, which, as indicated by arrow 26, will carry current in either direction depending upon the input control signal to the device of FIGURE 1. The load 25 can, for example, be a regulator control-type device.

The cores 10 through 13 are then provided with suitable D-C bias windings 30, 31, 32 and 33 respectively which are connected to D-C terminals 34 and 35 which are connected to some suitable constant current source. Control windings 36, 37, 38 and 39 are similarly provided in the usual manner for cores 10 through 13 respectively, and are connected in series with one another and to the terminals 40 and 41 which are the terminals for receiving the input control signal.

Figure 2:
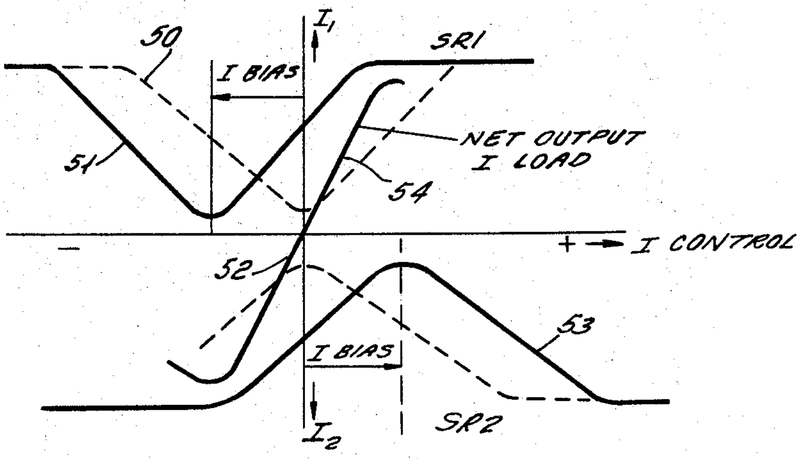
FIGURE 2 shows the operating characteristic of the circuit of FIGURE 1.

The characteristic operation of the device of FIGURE 1 is best illustrated in FIGURE 2 where the current through load 25 is shown as a function of the control current at terminals 40 and 41. More specifically, where this current is positive or flows upwardly through resistor 25, it is shown as current $I_1$, while when negative (with the polarity reversed and the current flowing downwardly through load 25), the current is labeled $I_2$.

The characteristic curves of the portion of the system including cores 10 and 11 is shown in dotted line 50, this characteristic being shifted to the solid line position 51 by virtue of the bias current $I_{bias}$ on the cores 10 and 11. In a similar manner, the characteristic dotted curve 52 of the system including cores 12 and 13 is shifted to the right to the solid line 53 by the bias current $I_{bias}$. Accordingly, the net control characteristic is the solid line 54 wherein the polarity of the output current through load 25 changes when the control signal passes through zero.

As outlined above, this type of reversible output polarity control circuit is subject to many disadvantages.

It is to be noted that the circuit of FIGURE 1 shows only one type of presently well-known push-pull type circuit. Many other circuits are well known and in common use, such as a push-pull magnetic amplifier of the self-saturating type. All of these magnetic push-pull circuits, however, have in common the disadvantages of local instability, non-linearities, drift, and the like.

The principle of the present invention is to provide a novel control circuit having considerably improved operational characteristic as compared to that of FIGURE 1, and which eliminates the need for a separate D-C bias.

The circuit of the present invention is shown in FIGURE 3 in diagrammatic form wherein the concept of super-position of an auxiliary A-C bias output of a transductor is utilized.

It is to be noted that while the description of the device of FIGURE 3 is for the case of square wave excitation, any other type excitation can be used including sinusoidal-type excitation.

In FIGURE 3, the transductor used is composed of two magnetic cores 60 and 61. Windings 62 and 63 are then connected in series with one another and to terminals 64 and 65 which are connected to the input control signal. An impedance 66 is connected in this control circuit, as shown. Two output windings 67 and 68 are additionally wound on cores 60 and 61 and form the output windings of the transductor.

A master oscillator 69 which has a square wave output is then provided, and is connected over conductors 70 and 71 to an auxiliary reference oscillator 72 and an excitation oscillator 73. The excitation oscillator 73 is then connected in series with differential resistor 74 and a resistor 75. The output of the excitation oscillator 73 is, of course, a square wave output substantially identical in phase to that of master oscillator 69. The principle of the invention involves the use of the auxiliary reference oscillator 72 which is connected across the differential resistor 74 in series with the resistor 76.

It is to be specifically noted that the circuit of FIGURE 3, with the exception of the auxiliary reference oscillator 72 and resistor 76, is a basic transductor circuit well known to the art.

In accordance with the invention, however, the output of the auxiliary reference oscillator 72 is electrically mixed with the output of the transductor in the differential resistor 74. The output of the system is then taken through leads 77 and 78 to a phase and magnitude sensitive demodulator as will be shown later. In order to obtain current differential in differential resistor 74, the resistors 75 and 76 are preferably higher in value than the value of resistor 74.

Figures 4A, 4B, 4C, 4D:
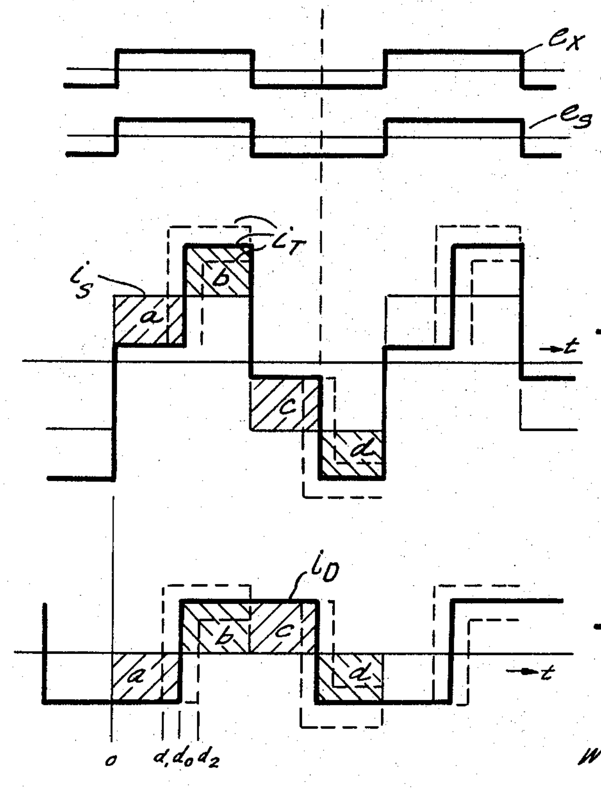

The operation of the circuit of FIGURE 3 is best understood by reference to FIGURES 4*a* through 4*d*. FIGURES 4*a* and 4*b* show the output voltages $e_x$ and $e_s$ of the excitation oscillator 73 and auxiliary reference oscillator 72 respectively. These voltages are of the square wave type, as previously indicated, and have instantaneous polarities at given times as shown in FIGURE 3.

The auxiliary AC reference current caused to flow through resistor 74 due to the output voltage $e_s$ of the auxiliary oscillator 72 is indicated in FIGURE 4*c* by the thin line-$i_S$. The current solely due to the transductor output is illustrated as the current $i_T$ in FIGURE 4*c* which is shown in the heavy line and represents in this example the output in case of low or medium impedance 66 of FIGURE 3 (i.e. operation with non-suppressed even-harmonic currents). The specific value to which the current $i_S$ is adjusted for a given current $i_T$ is that in which the areas *a* and *b* in FIGURE 4*c* are equal to one another. The difference between these two currents $i_T$ and $i_S$ is the currents $i_D$ which is shown in FIGURE 4*d*. Note that for the discussed case at the time T/4 or the angle $\alpha_0$, the differential current $i_D$ is 90° out of phase with the voltages $e_x$ and $e_s$.

The dotted lines shown in FIGURE 4*c* for the current $i_T$ illustrates the variation of the current $i_T$ when the control current applied to winding 62 and 63 vary. These variations also occur in the current $i_D$, as illustrated by the dotted lines.

In the novel circuit of the invention, the auxiliary current $i_S$ acts as a new zero line for the transductor output current $i_T$. Thus, the differential current $i_D$ in resistor 74 is proportional to the magnetic device output. That is to say, $i_S=i_T-i_S$.

Assuming that the current $i_S$ and the volt second area under the voltage $e_s$ are constant, then the rectified half cycle average value.

$$I_D=\frac{2}{T}\int_t^{t+T/2}|(i_T-i_S)|dt=I_T-I_S$$

Since $I_T$ is related to the control current $I_C$ in some way, then $I_D=KI_C-I_S$ where K is the function relating $I_C$ and $I_T$.

By suitable use of amplifiers and demodulators, or suitable phase-magnitude sensitive detectors, it is now possible to obtain a reversible output characteristic which, with proper circuitry, is the original transductor average chaacteristic displaced by some constant amount $I_S$ and multiplied by the gain in the intermediate stages.

Moreover, since at different levels of control current $I_C$ and thence different levels of transductor output $i_T$ (shown in the dotted lines of FIGURE 4*c*), the differential current $i_D$ (shown in dotted lines in FIGURE 4*d*) changes proportionally and can thereby be used to provide signals for other elements of the system.

The various demodulators and amplifiers selected may be employed to detect and increase or decrease in the average level of the differential current $i_D$ or, with suitably designed amplifiers, one can operate in a switching or saturated mode with phase sensitive discriminators detecting the change in the angle $\alpha$ which is proportional to the control current. That is to say, when the angle $\alpha_0$, which is the null position, decreases to $\alpha_1$, this is indicative of the increase in control current. In a similar manner, an increase of $\alpha_0$ to $\alpha_2$ indicates a decrease in control current at given connections or polarities of the demodulators.

One important advantage of the novel circuit of FIGURE 3 is that the operating point at zero output current of the demodulating devices is approximately half way between the maximum and minimum output of the transductor. The transductor output is not added to or subtracted from one of the counterpart magnetic devices in the push-pull circuit. There are no diodes in the transductor circuit and the transductor load impedance or burden is essentially constant. Therefore, the device will not exhibit instabilities at zero output current but will offer constant gain in the region where the control current varies around some given value.

It is noted that the current gain in the circuit, when using electrical superposition of currents, is somewhat lower than that in commonly used push-pull amplifiers. This, however, can be easily compensated through the use of stable AC amplifiers in the subsequent stages, since the output at leads 77 and 78 is of the AC variety.

It will be apparent that many arrangements can be devised utilizing the novel AC signal superposition shown generally in FIGURE 3 to obtain reversible polarity output. In each case, the circuit will operate in a manner similar to that of presently available push-pull amplifiers used as error detectors.

One typical manner in which a complete circuit can be formed using the present invention is shown in FIGURE 5 which shows the novel magnetic system used with a ring demodulator. In FIGURE 5, the transductor system is the same as that set forth in FIGURE 3, and similar numerals are used in FIGURE 5 to identify the transductor components of FIGURE 3.

Referring now to FIGURE 5, the master oscillator 69 is more specifically illustrated as a transistorized oscillator of any well-known saturable core type which, for example, uses two transistors 80 and 81. The output of the master oscillator is then connected to a switching transformer 82 having secondary windings 83 and 84. Winding 83 is connected to a transistorized oscillator or switching amplifier 85 whose output is connected to the transformer 86 which has two secondary windings 87 and 88. The output of transformer winding 87 is the equivalent of the excitation oscillator 73 of FIGURE 3, and supplies the output voltage $e_x$. The output of secondary winding portion 88 serves the purpose of the auxiliary reference oscillator 72 and provides the auxiliary voltage $e_s$ for providing the superimposed current for the differential resistor 74.

Winding 84 is then connected to drive a transistorized power oscillator or switching amplifier 90 which produces the demodulator reference voltage and, in turn, drives the demodulator structure generally shown as the demodulator 91. The demodulator includes the bridge connected rectifiers 92 and, if desired, the ring resistors 95 and connects the demodulated signal from transistorized power amplifier 93, which is coupled to leads 77 and 78 by signal transformer 94 to a filter including resistor 96 and capacitor 97 and the load 98. Note that the switching amplifier 90 and switching amplifier 85 are driven from the common master oscillator 69 to insure synchronous operation of the transductor-demodulator system. Operation of the ring demodulator is well known in the art and will not be described here. It shall be noted, however, that the demodulator DC voltage output is zero when the signal voltage is 90° out of phase with the reference voltage and changes polarity and value as a function of the signal voltage phase angle and magnitude.

The control characteristic of the circuit of FIGURE 5 is shown in FIGURE 6 wherein in this specific example the current $I_0$ through load 98 is shown in milliamperes as a function of the control current $I_C$ flowing through winding 62 and 63 in amperes. The horizontal scale also shows this value in ampere-turns.

In measuring the curve of FIGURE 6, the circuit used a 26-ohm resistor for resistor 76, a 13-ohm resistor for resistor 75, and a 2-ohm resistor for the differential resistor 74. The transductor structure included high quality magnetic cores which had sixteen turns for each of windings 67 and 68, and fifty turns for each of the control windings 62 and 63. The impedance 66 had an equivalent valve of 300 ohms, and a frequency of 6.8 kilocycles was used for the master oscillator 69.

As can be seen from the curve of FIGURE 6, the output current changes in polarity at a control current of approximately 0.05 amperes. Moreover, the curve of FIGURE 6 is essentially the original transductor control characteristic which is displaced to zero and multiplied by the gain of the intermediate stages between the transductor and the final load 98. Clearly, an increase in overall gain can be obtained by using AC amplifiers in any desired part of the circuit of FIGURE 5. Moreover, the ring demodulator circuit of FIGURE 5 could be replaced with other types such as a two-bridge demodulator, or the like. As previously indicated, sinusoidal sources of power as well as square wave sources may be utilized in the system.

It will be apparent that the transductor windings 62–63 can be replaced with a plurality of similar control windings and the transductor used as a limited differential device or current comparator. For example, one of the control winding pairs can be connected to a reference current source and the other one energized by the DC output current of a controlled power supply. The disclosed control circuit could then be used in the negative feedback loop of a current regulating system for the power supply.

Although the described embodiment shows a system controlled by a master oscillator with all AC source voltages in phase or 180° out of phase with another, the control circuit could employ excitation, auxiliary reference and demodulator reference phase shifted by a predetermined and fixed amount from each other, if such phase shift is needed to obtain the desirable input-output characteristic of the control circuit.

Although this invention has been described with respect to its preferred embodiments, it should be understood that many variations and modifications will now be obvious to those skilled in the art, and it is preferred therefore that the scope of the invention be limited not by the specific disclosure herein but only by the appended claims.

The embodiments of the invention in which an exclusive privilege or property is claimed are defined as follows:

1. A control circuit having a reversible polarity output comprising a signal generating device having input terminals and output terminals, a first and second source of voltage having predetermined output wave shapes and being in fixed phase relation with one another, a first and second impedance, and a differential impedance; said first source of voltage, said first impedance, and said differential impedance being connected in a closed series connected circuit; said second voltage source, said second impedance, said output terminals of said signal generating device, and said differential impedance being connected in a closed series circuit; a demodulating device having input terminals and output terminals; said input terminals of said demodulating device being connected in series with said differential impedance; the voltage output of said demodulator having a reversible polarity dependent upon the magnitude of the input signal connected to said input terminals.

2. The device substantially as set forth in claim 1 wherein said first, second and differential impedances are resistors.

3. The device substantially as set forth in claim 1 wherein said first and second impedances have greater ohmic values than said differential impedance.

4. The device substantially as set forth in claim 1 wherein said signal generating device comprises a transductor; said transductor including a first and second magnetic core; each of said first and second magnetic cores having first and second windings; said first windings comprising input windings and being connected in series with said input terminals; said second windings comprising output windings and being connected in series with one another and with said output terminals; one of said first or second windings being connected with opposing polarity to its said series connected winding.

5. The device substantially as set forth in claim 1 wherein said signal generating device has a substantially linear output control range; the polarity of the output current changing at a point in the central region of said control range.

6. The device substantially as set forth in claim 1 wherein said first and second source of voltage are comprised of respective first and second oscillators; and a master oscillator; said master oscillator being connected to said first and second oscillators to drive said first and second oscillators.

References Cited

UNITED STATES PATENTS

| | | | |
|---|---|---|---|
| 2,698,392 | 12/1954 | Herman | 329—50 X |
| 2,820,143 | 1/1958 | D'Nelly et al. | 328—134 X |
| 3,075,150 | 1/1963 | Berman et al. | 329—122 X |

ROY LAKE, *Primary Examiner.*

ALFRED L. BRODY, *Examiner.*